United States Patent

[11] 3,623,042

[72] Inventors Gary B. Woehler
Minneapolis;
Leroy A. Vos, St. Paul, both of Minn.
[21] Appl. No. 888,544
[22] Filed Dec. 29, 1969
[45] Patented Nov. 23, 1971
[73] Assignee Sperry Rand Corporation
New York, N.Y.

[54] MAGNETIC RECORD MEMBER FINE POSITIONING APPARATUS
10 Claims, 5 Drawing Figs.

[52] U.S. Cl. 340/174.1 E, 179/100.2 P, 226/174
[51] Int. Cl. G11b 5/60, G11b 5/78
[50] Field of Search 179/100.2 MJ, 100.2 P, 100.2 CA; 340/174.1 E, 174.1 C; 226/81, 174

[56] References Cited

UNITED STATES PATENTS 3,525,087 8/1970 Bukovich 340/174.15

*Primary Examiner*—Bernard Konick
*Assistant Examiner*—Vincent P. Canney
*Attorneys*—Thomas J. Nikolai, Kenneth T. Grace and John P. Dority ABSTRACT: An improved magnetic record member fine positioning apparatus for use in a magnetic memory system is described. The magnetic memory system includes a plurality of reading and recording transducers mounted in a rotatable support member for cooperating with a flexible record member. The flexible record member has a magnetic coating thereon and is maintained out of contact with the rotatable support member by a layer of air. A record member profile correction device is arranged with a record member retaining device for movably retaining one end of a flexible record member. Switchable members are arranged for cooperating with positioning notches in the other end of the flexible record member, the selection of one of the positioning notches cooperating with drag force of the supporting layer of air for accomplishing the fine positioning of the record member.

INVENTORS
GARY B. WOEHLER
LEROY A. VOS
BY Charles A. Johnson
ATTORNEY

MAGNETIC RECORD MEMBER FINE POSITIONING APPARATUS

BACKGROUND OF THE INVENTION

1. Field of the Invention

This invention relates to the magnetic recording and reading of information on a magnetic medium; and, more particularly, to a system for providing fine positioning of a flexible magnetic record member over the rotatable support member in a magnetic record system for optimizing the alignment of recorded tracks on the record member, and the reading and recording heads in the rotatable support member, thereby obtaining an optimum amplitude readback signal.

2. Description of the Prior Art

Systems utilizing flexible record members in a memory system have been described in printed publications and in issued U.S. patents. It has also been found that an effective information storage system can utilize a plurality of reading and recording transducers mounted in a rotatable support member for cooperating with a magnetic record member supported on a layer of air. A relevant system of this type is illustrated in copending patent application of G. J. Ehalt, et al., Ser. No. 695,500, filed Jan. 3, 1968, now U.S. Pat. No. 3,460,946, entitled Rotating-Head Memory System, and assigned to the assignee of the present invention. In the memory system described therein, as the rotor is caused to spin, a record member is supported on a layer of air with a magnetic coating just out of contact with the surface of the rotor. Flux changes are caused in the reading and recording heads due to the movement of the heads past the magnetic surface of the record member. In such a system, information may be recorded and read as binary digits, referred to as bits, by a magnetic transducer device responsive to pulsed electrical energization to produce a magnetic field effective to magnetize certain portions of the magnetic record medium. The width of the recording portion of the transducer, also called a write core, generally defines the recorded track width. A plurality of such recording heads arranged in parallel results in a plurality of parallelly arranged tracks of data being recorded. Reading of such recorded information is accomplished by transducers sensing the flux change as the heads are caused to move past the recorded tracks.

The record member in such a magnetic memory system often times is several inches wide, thereby accommodating a plurality of parallelly arranged tracks. Often the number of such tracks can be as high as several hundred, with arrangements from 200 to 300 being most common. It is readily apparent, therefore, that to achieve spacing between tracks of this type, it is necessary to account for a variety of tolerances. For purposes of general discussion, these tolerances can be lumped into three general groupings, namely, electrical, mechanical, and environmental. The primary electrical tolerance relating to the effect of track spacing is referred to as "fringing," where fringing is the ability of the write core to deposit on a magnetic record surface a track of information which is somewhat wider than the actual write core width. Additionally, fringing can be considered as the ability of the read core to sense a magnetic track of information even though the closest edge of the read core may not be directly over a portion of the magnetized track. In the latter situation, it can be seen that if a read core is permitted to get too close to the next adjacent recorded track, erroneous information will be sensed as noise. Further, if a write core is too wide, the application of write current thereto will partially obliterate the next adjacent tracks, thereby effectively narrowing the width of such tracks. Narrowing of the next adjacent tracks lowers the reliability of the memory system in recovering recorded data. These factors become especially important when a magnetic record member is recorded on one magnetic memory system, is removed, and is either replaced for reading at a later time on the same magnetic memory system, or is ready by separate and distinct magnetic memory system. It can be seen that the alignment of the record member is critical in having the reading and recording transducers positioned over the prerecorded tracks.

The location of the reading and the recording transducers is also affected by mechanical tolerances, which are determined by existing machining and measurement practices. These of course include the tolerances in the support for the reading and recording transducers, including the bearings, and the mechanical tolerances of the record members.

Environmental tolerances include temperature and humidity considerations, as they relate to the magnetic record member and the rotatable supporting member. For those systems where the reading and recording transducers are mounted in a rotatable support member, often referred to as a rotor, for cooperation with a flexible magnetic record member, it will be seen that the base materials of the flexible record member can have different coefficients of expansion with regard to temperature changes and humidity changes, than those experienced in the reading and recording heads and the supporting rotor. A characteristic support material for the flexible record member is Mylar, which is especially susceptible to humidity changes. Further, any difference in the response of the record member and the rotor to changes of temperature and humidity will be accentuated where attempts are made to read relatively warm record members in a relatively cooler memory system, and where it is attempted to read relatively cold record members in a warm operating memory system.

In view of the foregoing described tolerance situations, it has been found difficult to maintain an exact lateral alignment of the reading and recording heads with respect to the recording tracks on the flexible magnetic record member. For equal widths of recorded tracks on the recorded medium, a lateral misalignment of the reading and recording heads with respect to the recording medium, due to the effects of any of the foregoing mentioned tolerances, will result in reduction of the track width of adjacent tracks during the recording operation and reduction in the readout signal during the reading operation.

The tolerance problems are compounded by any skew that might be introduced into the positioning of the flexible record member around the rotor. Skew will be considered to be the lateral displacement of one end of the record member with respect to the other end of the record member. Early attempts at minimizing skew and accounting for the various tolerance problems was to provide a closely machined edge guide for positioning the flexible record member around the rotor. It has been found, however, that such edge guiding does not adequately provide for the tolerance situations described above, and has an added problem of creating wear on the edge of the flexible record member. This wear adds to the tolerance problem in that as the width of the record member is caused to be reduced, the recorded tracks are moved laterally with respect to the reading and recording head. It has also been determined, that the use of the edge guiding results in certain tolerance buildup that tends to require a reduction of track density in order to permit the free interchange of recorded flexible record members from one memory system to another.

SUMMARY

In summary, then, this invention includes an improvement for a magnetic memory system, wherein the magnetic memory system includes a plurality of magnetic reading and recording transducers mounted in a rotatable support member, referred to as a rotor, for use in cooperation with a flexible record member. The flexible record member includes a magnetizable coating on at least one surface and has retaining openings at one end, and positioning notches at the opposite end. The flexible record member is supported by a flow of air at the peripheral surface of the rotor, with the magnetizable coating supported just out of contact with the peripheral surface of the rotor. A fixed surface is arranged in a predetermined relationship to the peripheral surface of the rotor, and is used for supporting positioning pins that are arranged for cooperating with the retaining openings in the flexible record member. The flexible record member is slidably disposed on the surface. A positioning means is arranged for cooperating with the positioning notches in the flexible record member, wherein the positioning apparatus includes a pushing block and actuator for each of the positioning notches. The arrangement is such, that the flexible record member is supported on the one of the pushing block that is actuated. When the flexible record member is supported on one of the pushing blocks, the drag force of the supporting layer of air causes the flexible record member to be aligned with an associated one of the positioning pins at the other end of the flexible record member. This guiding on the positioning notches and the retaining pins results in a reduction of tolerance buildup and permits a higher track density on the flexible record member.

A primary object of this invention, then, is to provide an improved fine positioning system for flexible record members and used in magnetic memory systems. Yet another object of this invention is to eliminate the necessity of edge guiding flexible record members, thereby reducing record member edge wear. Still a further object of this invention is to provide a fine positioning system that minimizes tolerance buildup, resulting in an increase in track density. Yet another object of this invention is to optimize the reading and recording transducer alignment with prerecorded tracks on a flexible magnetic record member. These and other more detailed and specific objectives will become apparent from a consideration of the detailed description of the preferred embodiment, the drawings, and the appended claims.

DESCRIPTION OF THE PREFERRED EMBODIMENT

Figures 1, 2:
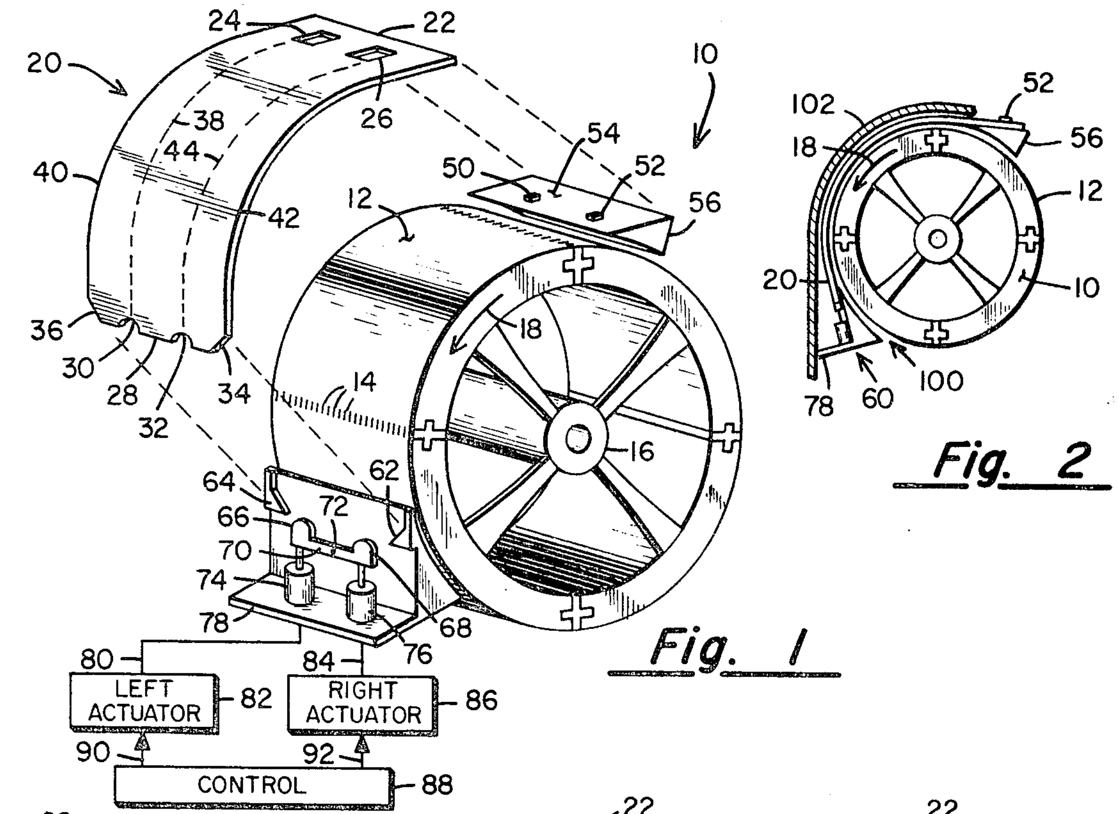
FIG. 1 is a diagrammatic view of a rotor supporting a plurality of reading and recording transducers, together with a flexible record member having alignment apertures and positioning notches for cooperating with a fine positioning system of this invention.
FIG. 2 is a side diagrammatic view illustrating the flexible record member in an operative relationship with a rotor, in accordance with this invention.

In FIG. 1 there is shown a diagrammatic view of a rotor, referred to generally as 10 having a peripheral surface 12, supporting a plurality of transducers, characteristically identified as 14, for reading and recording magnetically. The rotor 10 is arranged for rotation around axle 16, and is driven in the direction of arrow 18 by a power source (not shown) such as a motor, or the like. The support members and bearing members are not shown, but can be in the configuration as disclosed in the above identified copending patent application. A flexible record member 20 has a first end 22 with a pair of alignment apertures 24 and 26 therethrough. The flexible record member 20 has a second end 28 having a pair of positioning notches 30 and 32. The second end 28 also has beveled surfaces 34 and 36. The arrangement is such that the left edge of the alignment aperture 24 is aligned with the center of the positioning notch 30, and thus defines a line 38 which is positioned one quarter of the distance from edge 40 to edge 42. In a similar manner, the right edge of the alignment aperture 26 is aligned along a line 44 with center of the positioning notch 32, with the axial alignment being positioned three-quarters of the distance from edge 40 to edge 42. This arrangement results in a "quarter-line" positioning system.

The alignment apertures 24 and 26 cooperate with mechanical guide blocks 50 and 52, respectively. Positioning blocks 50 and 52 are adjustably mounted on surface 54, with surface 54 characteristically being a part of a vacuum shoe 56, utilized for correcting the profile of the flexible record member 20. A vacuum shoe of this type is illustrated and described in copending patent application entitled FLEXIBLE RECORD MEMBER PROFILE CORRECTING SYSTEM, filed Jan. 3, 1968, Ser. No. 695,502, now U.S. Pat. No. 3,525,087 and assigned to the assignee of the present invention. This arrangement is illustrative only, it being understood that it is necessary only that there be a supporting surface 54 upon which end 22 of the flexible record member 20 can be slidably retained. In this regard, should a profile correction system other than the vacuum shoe 56 be used, it is necessary only to provide a slidable surface 54, for providing the alignment of end 22.

The mechanism 60, utilized in conjunction with end 28 of the record member, is used for activating fine-positioning, and is fixedly mounted with respect to surface 54, a distance such that when apertures 24 and 26 are in cooperation with blocks 50 and 52, the beveled surfaces 34 and 36 can come in contact with mechanical guides 62 and 64, respectively. This arrangement provides a gross alignment of record member 20, and positions it such that the operation of the movable pushing blocks 66 and 68 in conjunction with notches 30 and 32, respectively, will result in the fine-positioning. In one embodiment, the two semicircular pushing blocks 66 and 68 are joined together by member 70, which is pivotally mounted at point 72. A pair of drivers 74 and 76 are supported on member 78 and are arranged for cooperating with the pushing blocks 66 and 68, respectively. In one embodiment, the drivers 74 and 76 are electrical solenoids capable of being activated upon the receipt of electrical signals. Solenoid 74 is coupled through wire 80 to the left actuator circuitry 82, and solenoid 76 is coupled via wire 84 to right actuator circuitry 86. Control circuitry 88 is utilized for sending control signals over line 90 to the left actuator 82 for providing a signal on wire 80 for causing solenoid 74 to extend the plunger. In a similar manner, the control circuitry 88 supplies a signal on line 92 to the right actuator 86 for supplying a signal over conductor 84 to cause solenoid 76 to extend its plunger. These operations will be described in more detail below.

As the rotor 10 spins, the record member 20 is supported on a layer of air just out of contact with surface 12. Due to the rotation in the direction of arrow 18, there is drag force imparted to the record member in the record member in the direction of arrow 18. This drag force tends to force the end 28 into the fine positioning-mechanism 60 such that beveled surfaces 34 and 36 are forced into contact with mechanical guides 62 and 64, respectively. Thereafter, signals applied from either the left actuator 82 or right actuator 86 causes the respectively associated pushing block 66 or 68 to be activated into contact with positioning notches 30 or 32, respectively. These operations will be described in more detail below. By utilizing a pair of positioning notches 30 and 32 in conjunction with a pair of positioning apertures 24 and 26, the record member 20 can be essentially treated as two parallel recording surfaces, with one of the recording surfaces having a center line 38 and the other of the recording surfaces having a center line 44. It should be understood, that the surfaces are not physically separate but are merely treated as separate for purposes of minimizing tolerance buildup and maximizing recording density. It is the function, then, of the control circuitry 88 to determine the appropriate addressing combination for selecting which of the two halves of the record member 20 are to be read from or recorded on. This addressing can be supplied from external equipment (not shown) such as computers, or the like.

The positioning blocks 50 and 52 are each generally rectangular in shape and have pairs of parallelly arranged flat sides. The height of the positioning blocks 50 and 52 is generally in the order of magnitude of the thickness of the flexible record member 20, and is adjustable. The positioning of the positioning blocks 50 and 52 on the surface 54 is also adjustable both axially and laterally. These adjustments are by any conventional mechanical adjustment systems. At original set up, or after major cleanup or repair, the record member positioning apparatus can be adjusted by the use of a master record member card having closely controlled tolerances. The master adjustment record member is placed on the memory system, and the positioning blocks 50 and 52 are adjusted axially and laterally to give the maximum readout signals for both the left-half and right-half of the record member. Once adjusted, the magnetic memory system normally can read and record on many flexible record member 20 over long periods of time, without the need for readjustment.

FIG. 2 is a side diagrammatic view illustrating the flexible record member 20 in an operative relationship with the rotor 10 in accordance with this invention. It can be seen that there is a close spacing 100 between the record member 20 and the surface 12 of rotor 10. The vacuum shoe 56 is positioned adjacent the rotor surface 12, and it can be seen that the positioning block 52 protrudes through the flexible record member 20 only a very short distance. The end 22 is slidably held on surface 54 by the vacuum action of shoe 56. If a vacuum shoe is not used, a downward pressure of air from a source (not shown) will slidably hold end 22. A protective shroud 102 is shown broken away, and is utilized for surrounding the memory system for providing a controlled ambient condition in the vicinity of the rotor 10. The mechanism 60 has member 78 mounted to shroud 102.

Figure 3:
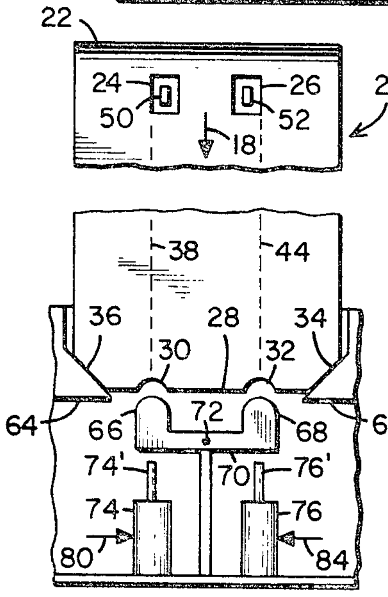
FIG. 3 is a diagrammatic view of the flexible record member with one end in the mechanical guides with the pushing blocks retracted.

FIG. 3 is a diagrammatic view of a flexible record member 20 having end 28 extended to a position that beveled surfaces 34 and 36 are in contact with mechanical guides 62 and 64, respectively. Neither solenoids 74 and 76 have signals applied thereto, so plungers 74' and 76' are both withdrawn. This also results in positioning blocks 50 and 52 being approximately centered in apertures 24 and 26, respectively. In this position, no reading or recording would normally be accomplished, and would result when the record member 20 is being loaded into the system.

Figure 4:
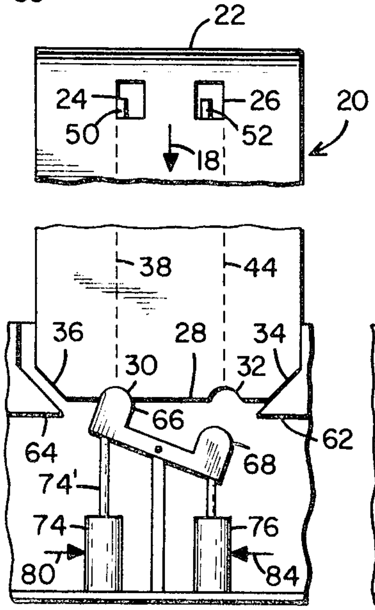
FIG. 4 illustrates the flexible record member supported by the left positioning block and shows the record member aligned with the left alignment pin.

FIG. 4 illustrates a flexible record member 20 having end 28 supported on the pushing block 66 in positioning notch 30. This results when a signal is applied on line 80 to solenoid 74, thereby causing plunger 74' to be extended. As end 28 is supported on pushing block 66, end 28 is raised slightly so that beveled surfaces 34 and 36 are lifted out of contact from guides 62 and 66, respectively. The lifting of end 28 in the record member 20 and the drag force of the supporting layer of air, such that end 22 is moved to the right a sufficient distance so that aperture 24 and its leftmost edge in contact with the leftmost surface of positioning block 50. This positioning arrangement will be utilized when reading or recording is to be performed on the left-half of the record member 20, with center line 38 being approximately the center of the left-half of the surface.

Figure 5:
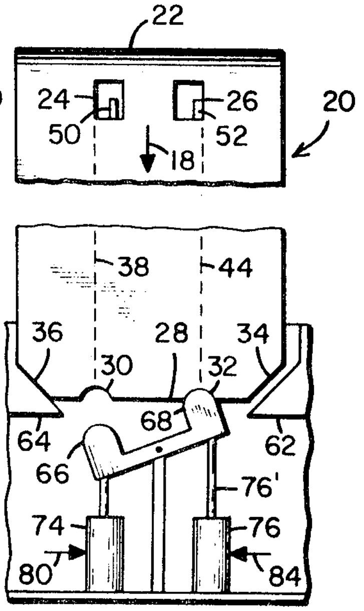
FIG. 5 illustrates the record member supported on the right positioning block with the record member aligned with the right retaining pin.

FIG. 5 illustrates the record member 20 supported on the rightmost pushing block 68, with the beveled surfaces 34 and 36 again held out of contact with guides 62 and 64. This positioning arrangement is achieved by a signal on conductor 84 to solenoid 76 for causing the plunger 76' to be extended. In a manner similar to that described above, the lifting of end 28 out of contact with the guides 62 and 64 allows the couple of the record member 20 to the drag force, to cause end 22 to move to the left a distance sufficient that the rightmost edge of aperture 26 is in contact with the rightmost surface of positioning block 52. This arrangement causes the record member 20 to be positioned for reading or recording on the right-half of the surface. The right-half of the surface is approximately centered on dashed line 44.

The fine-positioning system described above, results in a "quarter-guiding" arrangement that causes the track-to-head alignment problem to be reduced to one-quarter the width of the record member, when considering record member expansion and contraction that results from temperature and humidity changes. Further, tolerance buildups are limited to one-quarter of that would be encountered in an edge-guiding system. Finally, since the fine-positioning system does not relay on reference to an edge of the record member, there is no edge-wear and this problem is totally eliminated.

Having now, then, fully described the invention, and recognizing that the various details and modifications would become apparent to one skilled in the art without departing from the spirit and scope of the invention, what is intended to be protected by Letters Patent is defined in the appended claims.

We claim:

1. For use in a magnetic memory system, fine-positioning apparatus comprising: rotatable support means for supporting a plurality of magnetic transducers, a rotatable support means generating a flow of air having a drag force at the peripheral surface thereof; flexible record member means having a first end with retaining means and a second end with positioning notches, and a magnetizable coating on at least one surface thereof for cooperating with the magnetic transducers in said rotatable support member, said record member means being supported out of contact with said rotatable support means by said flow of air; record member profile correction means having a positioning surface and coupled in a predetermined fixed relation to said peripheral surface for correcting the profile of said flexible record member means, said first end of said record member means being positioned and slidably held on said positioning surface, and said profile correction means having a pair of pin means for cooperating with said retaining means, each of said pin means having at least one record member positioning surface; and positioning means for cooperating with said positioning notches for fine-positioning said flexible record member means, said positioning means including pushing block means and actuator means in cooperation with each of said positioning notches for supporting said second end of said flexible record member means on the actuated one of said pushing block means when the associated one of said actuator means is actuated, said drag force causing said first end of said flexible record member means to be slidably fine positioned with said retaining means in contact with an associated one of said record member means positioning surface.

2. Fine-positioning apparatus as in claim 1 wherein said retaining means includes a first rectangular aperture having at least a first bearing edge for cooperating with said record member means positioning surface of one of said pin means, said first bearing edge being substantially axially aligned with one of said pushing block means, and a second rectangular aperture having at least a second bearing edge for cooperating with said record member means positioning surface of another one of said pin means, said second bearing edge being substantially axially aligned with another one of said pushing block means.

3. Fine-positioning apparatus as in claim 2 wherein each of said pushing block means include a generally semicircular bearing surface for cooperating with an associated one of said positioning notches, and each of said actuator means includes solenoid means for causing the associated one of said pushing block means to be moved toward said positioning notch in response to received actuation signals.

4. Fine-positioning apparatus as in claim 3 and further including mechanical guide means for cooperating with beveled surfaces on said flexible record member means for providing gross positioning of said second end.

5. Fine-positioning apparatus as in claim 4 and further including control means for providing actuation signals to the selected one of said actuator means for lifting said second end out of contact with said mechanical guide means for initiating the fine positioning operation.

6. For use in a magnetic memory system, fine positioning apparatus comprising: rotatable support means for supporting the plurality of magnetic transducers, said rotatable support means generating a flow of air having a drag force at the peripheral surface thereof when in a state of rotation; flexible record member means having first and second ends and a magnetizable coating on at least one surface thereof for cooperating with the magnetic transducers in said rotatable support means, said flexible record member means being supported out of contact with said rotatable support means by said flow of air; first fine positioning means coupled to said first end for providing limited longitudinal and transverse positioning of said record member means; and second selectively actuatable fine positioning means coupled to said second end for moving said second end predetermined longitudinal and transverse distances, said drag force coupled to said flexible record member means motivating said first fine-positioning means.

7. Fine-positioning apparatus as in claim 6 wherein said first fine-positioning means includes retaining aperture means in said first end of said flexible record member means, support means for slidably supporting said first end, and pin means mounted on said support means for cooperating with said retaining aperture means for fine-positioning said first end to one of a plurality of operative positions.

8. Fine-positioning apparatus as in claim 6 and further including mechanical guide means in cooperation with a portion of said second end of said flexible record member means for providing gross positioning of said flexible record member means.

9. Fine-positioning apparatus as in claim 8 wherein said second selectively actuatable fine positioning means includes positioning notches in said second end of said flexible record member means, pushing block means in cooperation with respectively associated ones of said positioning notches, and actuator means for causing selected ones of said pushing block means to move for lifting said second end out of contact with said mechanical guide means, whereby said drag force completes the fine-positioning of said flexible record member means.

10. Fine-positioning apparatus as in claim 9 and further including control means coupled to said actuator means for providing actuation signals to cause said flexible record member means to be fine-positioned to one of a plurality of operative positions.

* * * * *